(12) United States Patent
Mehta

(10) Patent No.: US 9,478,340 B2
(45) Date of Patent: Oct. 25, 2016

(54) SOLENOID HOUSING AND METHOD OF MAKING THE SAME

(71) Applicant: Shreyas R. Mehta, White Plains, NY (US)

(72) Inventor: Shreyas R. Mehta, White Plains, NY (US)

(73) Assignee: Indimet, Inc., White Plains, NY (US)

( * ) Notice: Subject to any disclaimer, the term of this patent is extended or adjusted under 35 U.S.C. 154(b) by 0 days.

(21) Appl. No.: 14/146,122

(22) Filed: Jan. 2, 2014

(65) Prior Publication Data

US 2014/0111295 A1    Apr. 24, 2014

Related U.S. Application Data

(63) Continuation-in-part of application No. 13/439,409, filed on Apr. 4, 2012, now Pat. No. 8,643,452.

(51) Int. Cl.
| | |
|---|---|
| *B21K 23/00* | (2006.01) |
| *H01F 7/126* | (2006.01) |
| *B21K 21/08* | (2006.01) |
| *B21J 5/06* | (2006.01) |
| *B21J 15/02* | (2006.01) |
| *B23P 17/04* | (2006.01) |
| *H01F 3/14* | (2006.01) |
| *H01F 7/08* | (2006.01) |
| *H01F 7/16* | (2006.01) |
| *H01F 41/02* | (2006.01) |

(52) U.S. Cl.
CPC ............ *H01F 7/126* (2013.01); *B21J 5/06* (2013.01); *B21J 15/02* (2013.01); *B21K 21/08* (2013.01); *B21K 23/00* (2013.01); *B23P 17/04* (2013.01); *H01F 3/14* (2013.01); *H01F 7/081* (2013.01); *H01F 7/1607* (2013.01); *H01F 41/0206* (2013.01); *H01F 2007/083* (2013.01); *H01F 2007/085* (2013.01); *Y10T 29/49009* (2015.01); *Y10T 29/49826* (2015.01); *Y10T 29/49945* (2015.01); *Y10T 29/49956* (2015.01)

(58) Field of Classification Search
CPC ... B21C 23/18; B21C 23/183; B21C 23/186; B21K 1/26; B21K 21/08; B21K 21/12; B21K 23/00; B21K 23/04; H01F 41/0206; B21J 1/04; B21J 5/06
USPC ............................ 72/267, 352, 356, 358, 359
See application file for complete search history.

(56) References Cited

U.S. PATENT DOCUMENTS

| | | | | |
|---|---|---|---|---|
| 2,116,805 | A * | 5/1938 | Swanson | 72/109 |
| 2,161,419 | A * | 6/1939 | Juriaan Lambeek et al. | 72/259 |
| 2,966,987 | A * | 1/1961 | Kaul | 72/256 |
| 3,200,630 | A * | 8/1965 | Wilson | 72/254 |
| 4,580,431 | A * | 4/1986 | Oku | B21K 1/30 72/334 |
| 5,870,818 | A | 2/1999 | Bisaga | |
| 5,986,530 | A | 11/1999 | Nippert | |
| 6,151,777 | A * | 11/2000 | Sakuraba | B21C 23/186 29/557 |
| 6,609,286 | B2 * | 8/2003 | Nakao | B21K 1/32 148/691 |

(Continued)

FOREIGN PATENT DOCUMENTS

| | | | | |
|---|---|---|---|---|
| DE | 23 30 839 | | 1/1975 | |
| GB | 2266485 | A * | 11/1993 | B21C 23/20 |

*Primary Examiner* — Edward Tolan
(74) *Attorney, Agent, or Firm* — IP Attorneys Group, LLC

(57) ABSTRACT

The invention relates to a solenoid housing fabricated by a method which allows a manufacturer to produce a high performing product while minimizing manufacturing complexity and time. The instant invention uses cold-forging techniques to reduce the need for fine machining processes.

2 Claims, 13 Drawing Sheets

(56) References Cited

U.S. PATENT DOCUMENTS

| | | | |
|---|---|---|---|
| 6,640,834 B1 | 11/2003 | Hamkins | |
| 6,742,240 B2 * | 6/2004 | Mikkonen | 29/601 |
| 7,117,704 B2 * | 10/2006 | Ogura et al. | 72/255 |
| 8,087,279 B2 * | 1/2012 | Nakajima et al. | 72/354.6 |
| 8,713,793 B2 * | 5/2014 | Morii et al. | 29/888.4 |
| 8,869,377 B2 * | 10/2014 | Mehta | 29/527.5 |
| 8,904,845 B2 * | 12/2014 | Su | B21J 5/02 29/898.048 |
| 2003/0076002 A1 * | 4/2003 | Pritchard | B21D 22/16 310/265 |
| 2007/0006628 A1 * | 1/2007 | Tabei | B21J 5/06 72/348 |
| 2008/0237520 A1 | 10/2008 | Sugiyama | |
| 2008/0257009 A1 * | 10/2008 | Mehta et al. | 72/377 |
| 2009/0140189 A1 | 6/2009 | Kokubu | |
| 2009/0205393 A1 * | 8/2009 | Mehta et al. | 72/370.12 |

* cited by examiner

SOLENOID HOUSING AND METHOD OF MAKING THE SAME

CROSS REFERENCE TO RELATED APPLICATION

This application is a continuation-in-part of and claims priority to and the benefit of U.S. patent application Ser. No. 13/439,409 filed Apr. 4, 2012, titled "Solenoid Housing with Elongated Center Pole" which is incorporated herein by reference in its entirety.

FIELD OF THE INVENTION

The field of the invention relates to advantageous methods of fabricating solenoid housings.

BACKGROUND OF THE INVENTION

Solenoid assemblies are typically found in a myriad of modern products, from the control of anti-lock braking systems and automatic transmissions in automobiles, to pressurized water control in irrigation systems, to more general uses such as in doors, windows, many hydraulic controls, and the like.

Solenoids typically make use of a high magnetic reluctance region to facilitate movement of an armature along a set path in response to the application of an electric current. This region can be referred to as an "air gap" because empty space is commonly used as the high magnetic reluctance region. Such an arrangement with a literal air gap, however, may lead to certain difficulties in both construction and operation of the solenoid. Certain prior art teachings disclose the air gap may be achieved through a two piece construction of the solenoid with a gap left between the two pieces. Each piece may have a different conformation, meaning that separate, specialized manufacturing processes could be required for each piece. Further, if the two pieces need to be aligned properly to allow for easy movement of the armature through each piece and across the air gap, extra calibration and alignment procedures may be necessary. All of these additional steps generally increase manufacturing complexity, meaning more time and cost may be necessary to produce a single solenoid than if said extra calibration and alignment procedures were eliminated.

There may be the fear of decreased manufacturing efficiency and operational lifetimes associated with these prior art solenoids as well. For example, if a solenoid were produced in a two-piece arrangement with a certain degree of allowed deviation from the ideal alignment of the first and second piece, solenoids may be produced outside of this tolerance, and the time and cost necessary to produce said solenoid would have been wasted. Further, since a two-part construction like the one described above may be unlikely to produce ideal alignments on a consistent basis, the average operation lifetimes of the solenoids may decrease by general wear and tear (caused by frictional forces of the armature on the solenoid housing after days, months, or years of repeated rubbing due to misaligned solenoid components).

Further, traditional solenoid housing manufacturing and assembly is typically a multi-stage machining and welding process requiring a series of highly specialized machines, skilled manufacturing personnel, and time to perform each manufacturing step to produce a quality, reliable product. For example, the lathes which can be used for machining a central armature path in prior art processes are often expensive and require a large amount of space for proper operation, and welding methods may need to be completed in tight spaces and with little room for error or inconsistency in the weld. The imprecision and complexity of the prior art processes may produce solenoids and solenoid housings with inherent structural weaknesses, and produce them at a disadvantageously high rate. These manufacturing deficiencies may lead to premature operational failure of the prior art solenoid housings or a high rejection rate during the assembly process.

What is desired, therefore, is a method of making a solenoid housing which eliminates much of the manufacturing complexity found in the prior art. It is further desired that this novel method of making a solenoid housing improve the operation and increase the expectant operational lifetime of said solenoid housing.

SUMMARY OF THE INVENTION

It is therefore an object of the invention to provide a method of producing a solenoid housing utilizing cold-forging methods to eliminate multi-component fabrication and assembling, as well as provide a suitable analogue for the air gap.

In one embodiment, the invention relates to a solenoid housing comprising a center pole having a first end and a second end, a flattened disk at said second end of said center pole, a bore extending from a first end in a direction towards said second end, a non-magnetic region on said center pole, a protrusion on said second end, said protrusion having a protrusion perimeter and a protrusion end having a protrusion-end perimeter, wherein said center pole, flattened disk, and protrusion are formed of a one-piece construction, and a cup having a recess for accepting said protrusion, wherein said recess has a recess perimeter which is larger than said protrusion perimeter but smaller than said protrusion-end perimeter. In a further embodiment, the non-magnetic region is selected from the group consisting of a perforated region, a region comprised of non-magnetic material, a region wherein said region has a thinner cross-sectional area than a cross-sectional area of the remainder of the center pole, and combinations thereof. In another embodiment, the flattened disk has an outer perimeter, said cup has an inner perimeter, and said outer perimeter is substantially equal to said inner perimeter. In another embodiment, the cross-sectional area of said region is approximately 10-20% of the cross-sectional area of the remainder of the center pole.

In another embodiment, the instant invention relates to a method of providing a solenoid housing comprising the steps of providing a cylinder of malleable material having a part, extending a flange from said part, raising at least a portion of said part to form a raised wall, and raising a center pole from said part. In another embodiment, the method further comprises the step of machining a bore into said center pole to produce a center-pole raised wall. In other embodiments, the center-pole raised wall is provided with a non-magnetic region. In one embodiment, the non-magnetic region is selected from the group consisting of a perforated region, an area comprised of non-magnetic material, a region wherein said region has a smaller cross-sectional area than a cross-sectional area of the remainder of the center-pole raised wall, and combinations thereof. In embodiments where the non-magnetic region is a region wherein said region has a smaller cross-sectional area than a cross-sectional area of the remainder of the center-pole raised wall, the method further comprises the step of reducing said cross-sectional area of said region to be approximately 10%-20% of said cross-sectional area of the remainder of the center-pole raised wall. In a further embodiment, an annealing step is performed following at least one of the steps of providing a cylinder of malleable material having a part, extending a flange from said part, raising at least a portion of said part to form a raised wall, and raising a center pole from said part.

In one embodiment, the method of providing a solenoid housing of the instant invention comprises the steps of providing a cylinder of malleable material having a first part and a second part, said first part having a first-part perimeter and said second part having a second-part perimeter, reducing a size of the first-part perimeter to be less than a size of the second-part perimeter, compressing at least a portion of said second part in a direction towards said first part to produce a flattened disk, providing said cylinder of malleable material with a non-magnetic region, extending a bore from said first part toward said second part to at least a distance beyond said non-magnetic region, and providing a cup around said cylinder of malleable material. In a further embodiment, the step of compressing at least a portion of said second part in a direction towards said first part to produce a flattened disk also comprises the step of providing a protrusion on said second part.

In another embodiment, the above-mentioned cup is produced using a method comprising the steps of providing a sheet of malleable material, raising a perimeter of said sheet to produce a raised perimeter, extending said raised perimeter to define a cup with a base, and providing a recess in said base of said cup. In a further embodiment, the method of producing a cup comprises the step of expanding a flange on said raised perimeter. In one embodiment, the cup is produced through a machining method which provides a cup-bore into a cylinder of suitable material.

In a further embodiment, the cup is provided to the cylinder of malleable material though a method selected from the group consisting of assembling, riveting, press-fitting, and combinations thereof. In one embodiment, the riveting method further comprises the steps of inserting said protrusion into said recess and compressing said protrusion in a direction towards the first part.

In another embodiment, the solenoid housing is annealed following at least one of the steps of providing a cylinder of malleable material having a first part and a second part, said first part having a first-part perimeter and said second part having a second-part perimeter, reducing a size of the first-part perimeter to be less than a size of the second-part perimeter, compressing at least a portion of said second part in a direction towards said first part, providing said cylinder of malleable material with a non-magnetic region, and extending a bore from said first part toward said second part to at least a distance beyond said non-magnetic region.

BRIEF DESCRIPTION OF THE DRAWINGS

The features of the invention believed to be novel and the elements characteristic of the invention are set forth with particularity in the claims. The figures are for illustration purposes only. The invention itself, however, both as to organization and method of operation, may be understood by reference to the detailed description which follows taken in conjunction with the accompanying drawings in which the drawings show typical embodiments of the invention and are not intended to be limited of its scope.

DETAILED DESCRIPTION OF THE INVENTION

In describing the various embodiments of the instant invention, reference will be made herein to FIGS. 1-13 in which like numerals refer to like features of the invention.

Figure 1:
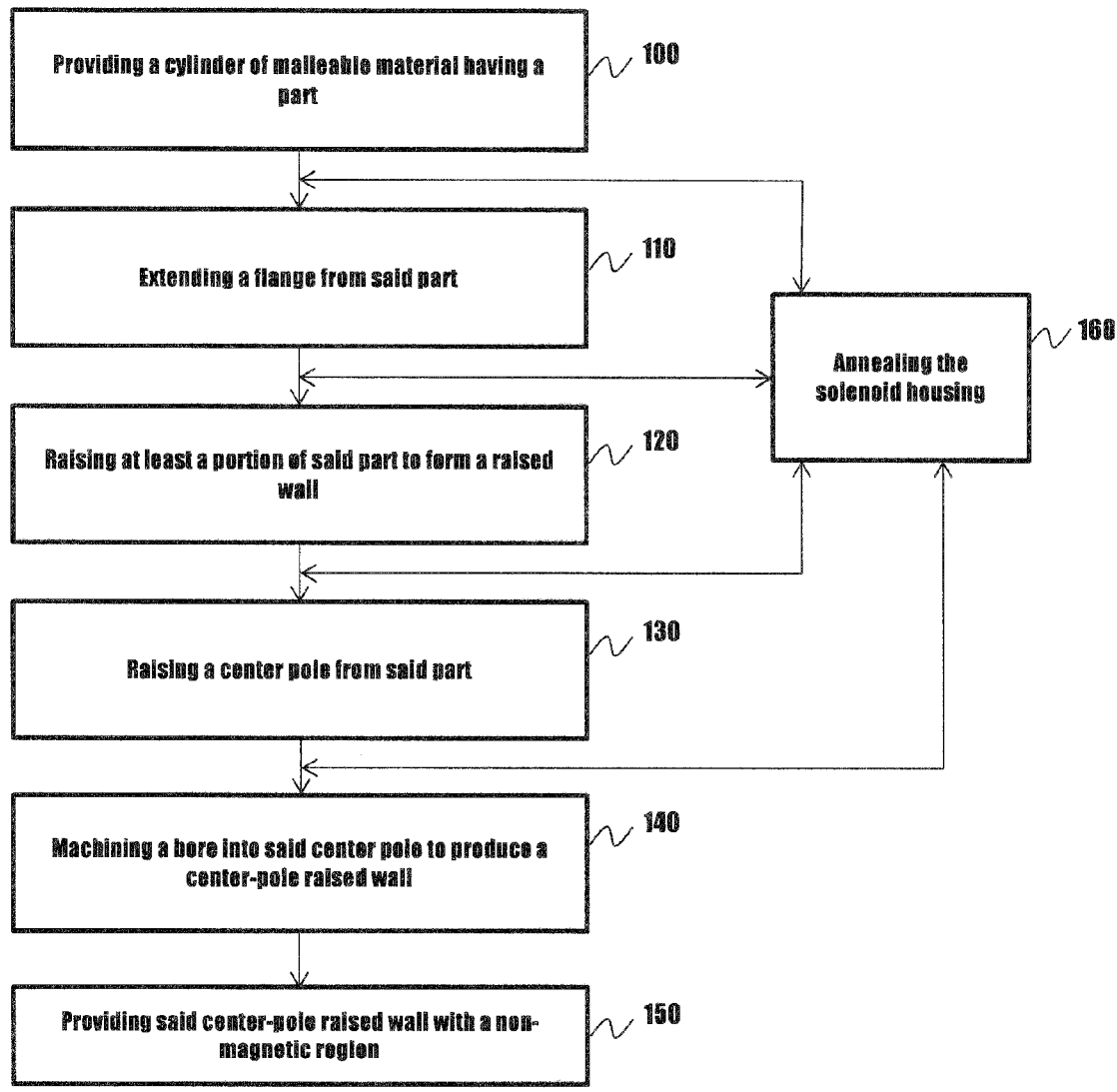
FIG. 1 depicts a method of providing a solenoid housing consistent with one embodiment of the instant invention.
Figure 2:
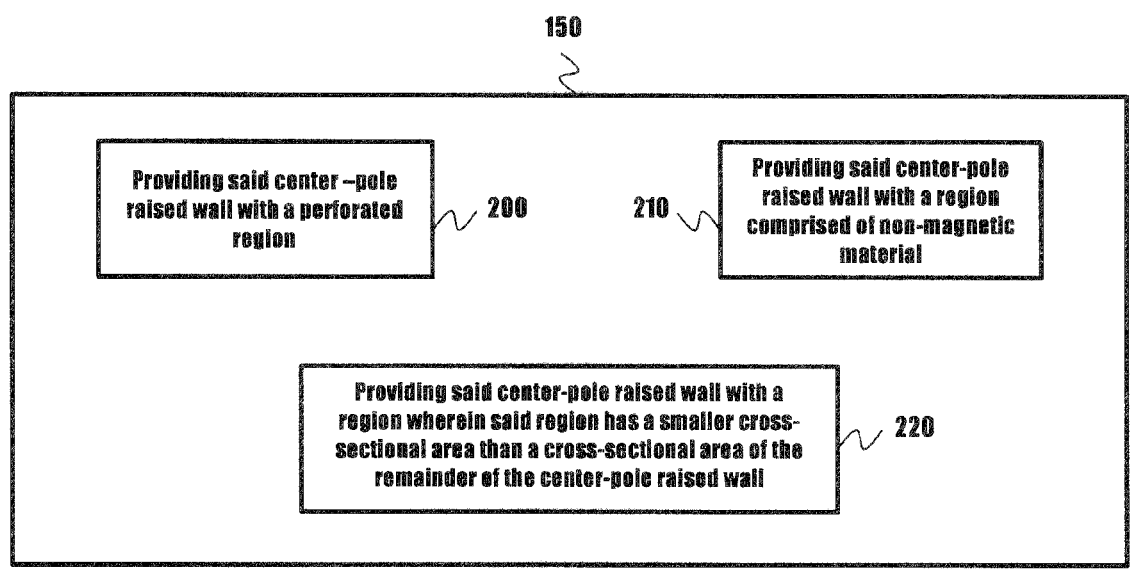
FIG. 2 depicts a further embodiment of the method of providing a solenoid housing from FIG. 1.

The instant invention generally relates to an improved method of making a solenoid housing, including fabrication of features such as the center pole for providing a path along which an armature will actuate and an outer cup enclosing the center pole as well as a space in which a solenoid coil will be held. In one embodiment of the instant invention, a cold-forging method has been found which allows for simplified fabrication of the solenoid as a one-piece construction from a single billet of malleable material. This embodiment is shown in FIG. 1, which depicts the step of providing 100 a cylinder of malleable material having a part. The cylinder is comprised of any malleable material suitable for use as a solenoid housing. In some embodiments, the malleable material is a low carbon steel. Herein, the cylinder of malleable material and all method steps for modifying said cylinder of malleable material will be described and portrayed as having a basic, curved cylindrical shape; that is to say that the ends of the cylinder are circles. However, the specific shape of the cylinder is not meant to be limited to this embodiment. In other embodiments, the outline of the cylinder is selected from the group consisting of a square, rectangle, triangle, pentagon, hexagon, octagon, polygon, and combinations thereof. The specific shape of the cylinder of malleable material is a design choice well within the abilities of one of ordinary skill in the art. In some embodiments, the part is provided as a region at or near the one of the ends of the cylinder of malleable material. In a further embodiment, the cylinder can be defined as having a first part and a second part, wherein the first part is subjected to the various cold-forging and machining steps that will be described herein, and the second part is in most cases held immobile.

After the cylinder is provided 100, a flange is extended 110 from the part. In one embodiment, this is performed by compressing part of the cylinder in a direction towards the remainder of the cylinder and holding said remainder of the cylinder of malleable material stationary in a form which only allows movement by the material comprising the part. In some embodiments, the flange is a raised perimeter which extends from the part in an axial direction, a radial direction, or both. In one embodiment, the flange expands to provide a constant perimeter around a circumference of the part.

At least a portion of the part is then raised 120 to form a raised wall. In some embodiments, the first part is raised by immobilizing a portion of the cylinder in a form and compressing the part in a direction towards the remainder of the cylinder with a die having a smaller diameter than the cylinder itself. When axially aligned with the cylinder of malleable material, compression of the die into the part forces material to extrude upwards around the outer edges of the die itself. The form, meanwhile, substantially prevents movement of the remainder of the cylinder of malleable material. The result of this compression step is a raised wall which extends the more the die compresses the part. The height of the raised wall is a function of the amount of material in the cylinder and the desired design of the solenoid housing. After raising step 120, the cylinder has been transformed into a hollow, cup-shaped housing with a flange around the top and a base of some thickness at the bottom.

A center pole is then raised 130 from the part. An annular die is used to raise this center pole from the material within the hollow, cup-shaped housing itself. Compression of the part in raising step 120 as described above moved the part of the cylinder to the bottom or floor of the hollow cup. In raising step 130, a hollow die again compresses the part. Material displaced by the compression in raising step 130 is extruded through the cavity within the hollow die in a direction opposite the direction of compression. The compression step continues until the center pole is raised to the desired height.

Figure 10:
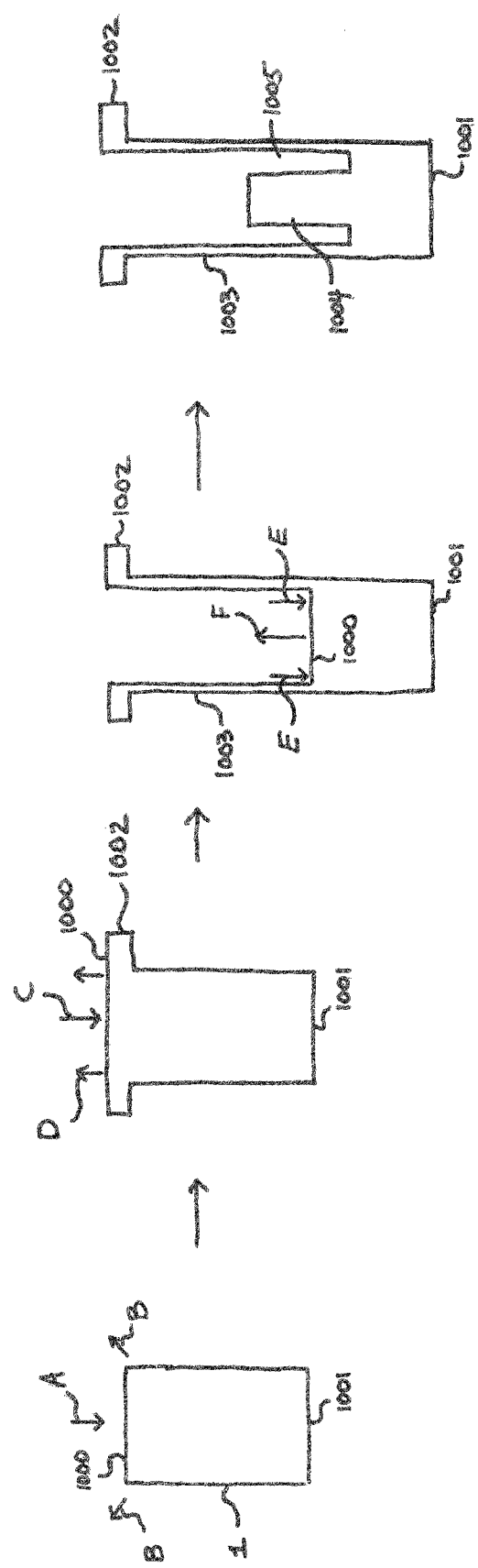
FIG. 10 shows a flowchart depicting the production of a solenoid housing consistent with the method as depicted in FIG. 1.

FIG. 10 is provided to pictorially demonstrate an embodiment of method steps 100-130 from FIG. 1. For the purposes of disclosing the following embodiment, the cylinder of malleable material will be described has having a first part and a second part. However, this description is not meant to provide any additional limitations into the embodiments described above or as claimed. In this embodiment, cylinder of malleable material 1 is subjected to force A at first part 1000 in a direction towards second part 1001. By immobilizing second part 1001 and a desired length of cylinder 1, first part 1000 is extended in directions B, resulting in flange 1002. A force C, brought by a die (not pictured) having a diameter which is less than that of cylinder 1, causes a section of first part to extend in a direction D and produce a first-part raised wall 1003, while the remainder of first part 1000 is compressed towards second part 1001. Center pole 1004 is then created by application of a force E by a hollow die (not pictured). Again, with second part 1001 held stationary, material displaced by said annular die will cause first part 1000 to extend in a direction F. In one embodiment, annular recess 1005 which results from this method step becomes the receptacle for the solenoid coil (not pictured).

In one embodiment, before or after at least one of method steps 110, 120, and 130, cylinder 1 is annealed 160. The annealing step 160 is performed to reduce stress on the malleable material during each of these steps, lessening the risk that the material will become brittle and liable to crack or fail in subsequent cold-forging steps. In some embodiments, annealing step 160 is performed by heating cylinder 1 to approximately 850° C., allowing said cylinder 1 to stay at that temperature before cooling said material to 720° C., and subsequently allowing said cylinder 1 to stay at that temperature before cooling cylinder 1 down to room temperature. In one embodiment, an annealing step is performed before and after each of method steps 110, 120, and 130.

In some embodiments, center pole 1004 created by method step 130 is modified to provide a path through which an armature is actuated. As depicted in FIG. 1, a bore is machined 140 into said center pole 1004 to produce a center-pole raised wall. In alternative embodiments, the bore is provided via a cold-forging step, or a combination of a cold-forging step and a machining step.

In a further embodiment, the center-pole raised wall is provided 150 with a non-magnetic region. As has been previously discussed herein and in parent application Ser. No. 13/439,409, the non-magnetic region is used to approximate an air gap and generate the force which actuates an armature through the solenoid assembly. In one embodiment, the air gap is approximated by providing 200 said center-pole raised wall with a perforated region, providing 210 said center-pole raised wall with a region comprised of non-magnetic material, or providing 220 said center-pole roasted wall with a region wherein said region has a smaller cross-sectional area than a cross-sectional area of the remainder of the center-pole raised wall, and combinations thereof.

Figure 8:
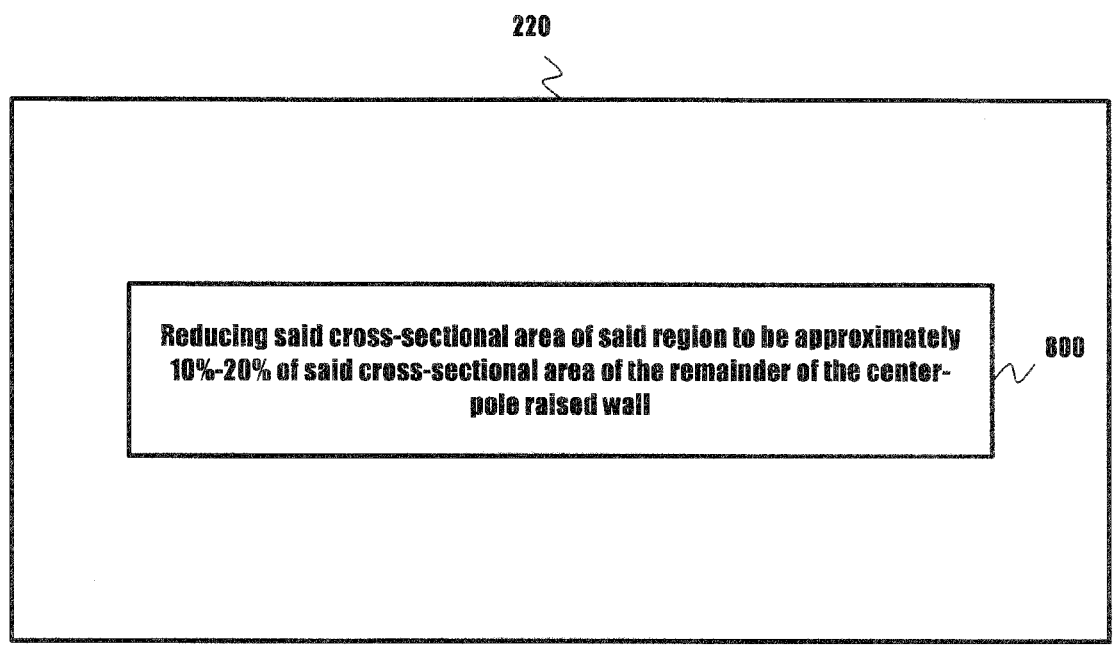
FIG. 8 depicts a further embodiment of the method of providing a solenoid housing from FIG. 2.

In one embodiment, providing step 220 is performed by reducing the cross-sectional area of said region to be approximately 5-25% of the cross-sectional area of the remainder of the center pole raised wall. In a further embodiment, the cross-sectional area of the region is reduced 800 to be approximately 10-20% of the cross-sectional area of the center-pole raised wall, as depicted in FIG. 8. Providing non-magnetic regions within these ranges strikes an optimal balance between performance and manufacturing ease and time. As has been previously discussed, the non-magnetic region on the center-pole raised wall approximates an air gap to facilitate movement of an armature through the solenoid assembly. The relative saturation of the air gap to its surroundings creates an electromotive force which acts upon the armature within the solenoid assembly. Due to air's high magnetic reluctance, an actual air gap saturates immediately. In the instant embodiment, thinning a region of the center-pole raised wall creates an air gap analogue by reducing said region's ability to hold magnetic flux. The magnetic reluctance of region is effectively increased, the result being that the magnetic flux saturates much quicker through the thin-walled region than the remainder of the center-pole raised wall.

When the center-pole raised wall is thinned to a width of about 30% or higher, said region remains permeable enough for magnetic flux so as to be an unsuitable air gap analogue; performance of the solenoid suffers significantly. The resulting electromotive force is weak and the response time delayed, sacrifices which are not offset by the ease of manufacturing gained by eliminating the complicated air gap fabrication process. However, by thinning the cross-sectional area of a region on the center-pole raised wall to approximately 5-25%, and more particularly to approximately 10-20%, the air gap is approximated to a degree such that performance closely mirrors that of an actual air gap. Non-magnetic regions with a cross-sectional area of approximately 25% that of the remainder of the center-pole raised wall provide a sufficient analogue to an air gap. However, performance increases are achieved with walls approximately 20% the cross-sectional area of the remainder of the center-pole raised wall or lower. Further, these thin walls of approximately 20% the cross-sectional area of the remainder of the center-pole raised wall maintain the increased structural rigidity and durability inherent in the substantially continuous path along which the armature may actuate. A one piece construction is significantly more resistant to misalignment than a two piece construction and results in a longer operational lifetime.

Complications arise when the relatively thin walls of the non-magnetic region are fabricated to widths less than 5% of the remainder of the center-pole raised wall. As thinner and thinner walls are achieved, the likelihood of introducing structural weaknesses to the solenoid housing increases. When producing walls with widths less than 5% of the remainder of the center-pole raised wall, there is a significant increase in the likelihood that the forces exerted on the solenoid housing by the fabrication method itself will result in warping or fracturing of the center pole. A solenoid which suffers this warping or fracturing is inoperable and must be rejected. By manufacturing the non-magnetic region at widths of 5% or above, however, the housing retains sufficient structural rigidity to survive the fabrication process, resulting in a low rate of failure during production. The rate of failure decreases even further when the center-pole raised wall is provided at a width greater than 10%. Levels of performance for those solenoid housings with non-magnetic regions between 10-20% remain acceptably high compared to their air gap analogues.

Figure 3:
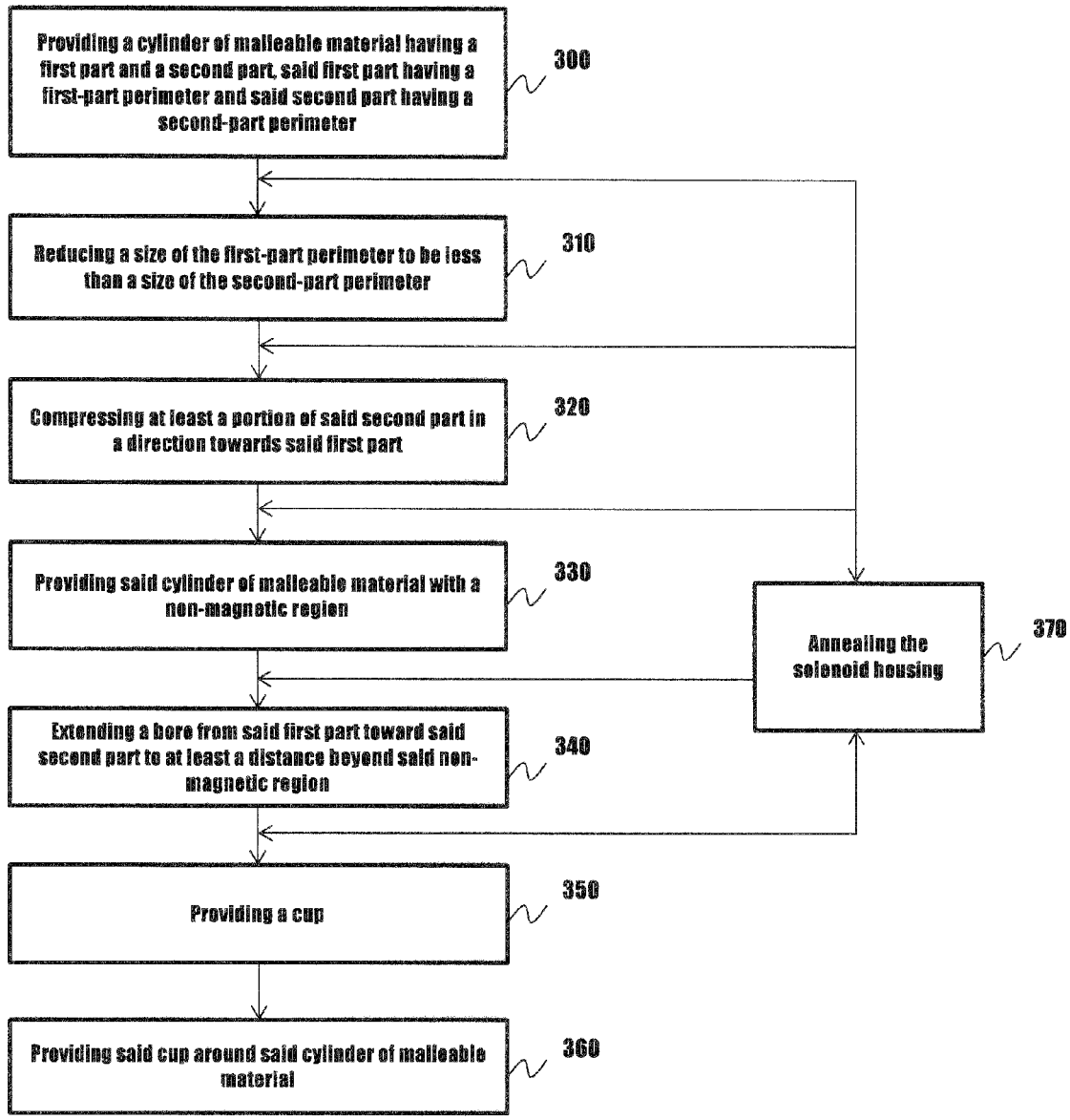
FIG. 3 depicts a method of providing a solenoid housing consistent with one embodiment of the instant invention.
Figure 4:
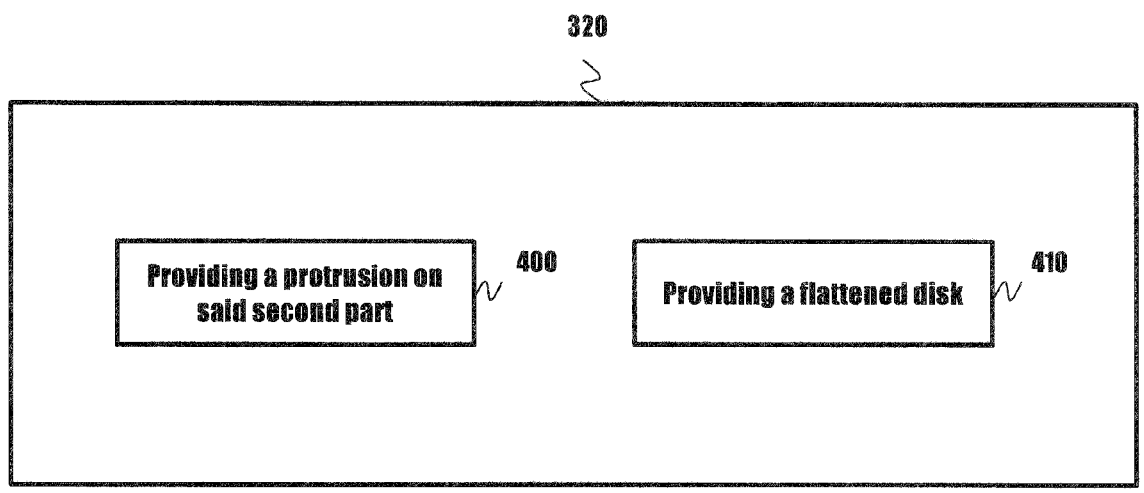
FIG. 4 depicts a further embodiment of the method of providing a solenoid housing from FIG. 3.

FIG. 3 depicts another embodiment of the instant invention for providing a solenoid housing comprising a step of providing 300 a cylinder of malleable material having a first part and a second part, said first part having a first-part perimeter and said second part having a second-part perimeter. As described above, the cylinder of malleable material may be comprised of any suitable material and any suitable shape. In one embodiment, the malleable material is low carbon steel.

Figure 11:
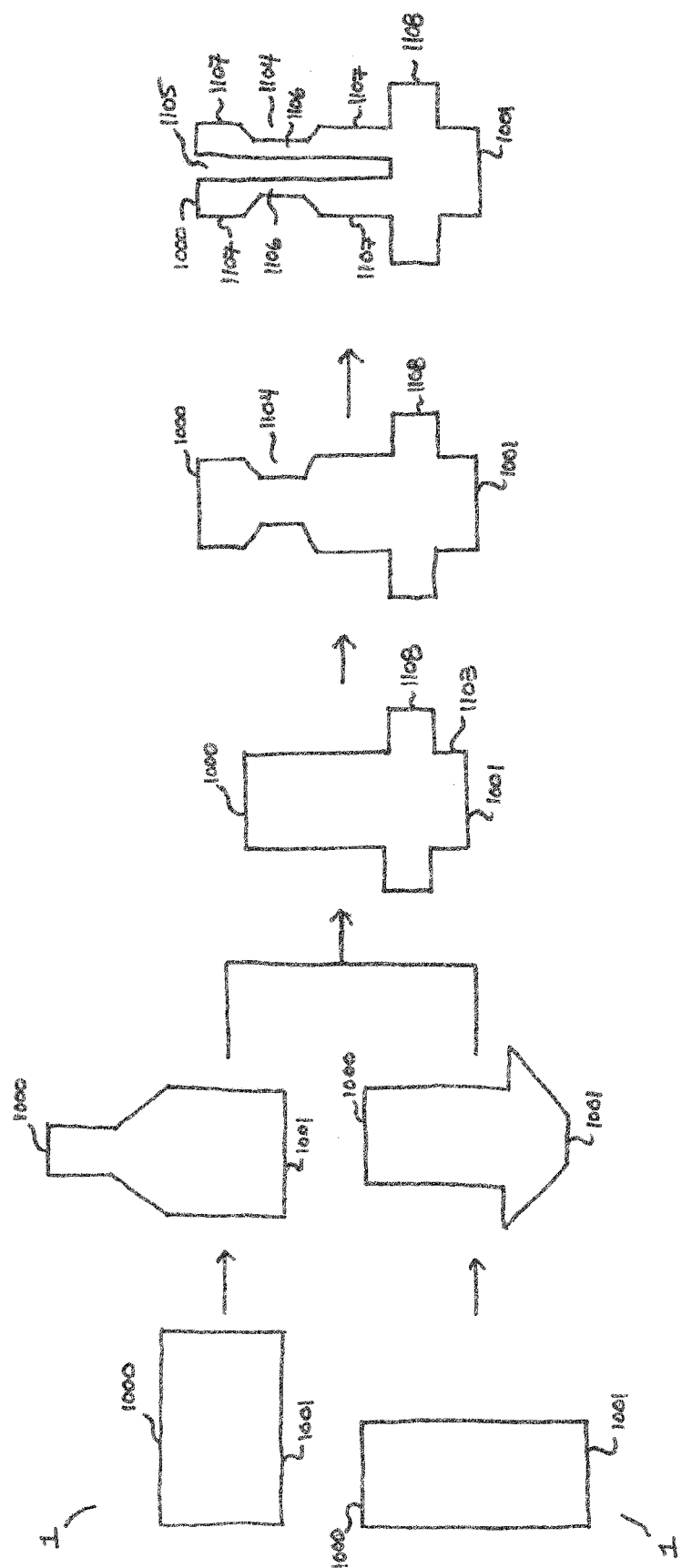
FIG. 11 shows a flowchart depicting the production of a solenoid housing consistent with the method as depicted in FIG. 3.

In some embodiments, the method of the instant invention comprises the step of reducing 310 a size of the first-part perimeter to be less than a size of the second-part perimeter. At least a portion of the second part is then compressed 320 in a direction towards the first part. In one embodiment, such as the one depicted in FIG. 4, compression step 320 provides 410 a flattened disk to said second part, provides 400 a protrusion on said second part, or both. Steps 310 and 320 are advantageous with certain sizes of starting billet cylinders of malleable material. Whether method steps 310 and 320 are advantageous is determined by the ratio of the axial length of the cylinder (L) to the width of the cylinder (D), or the value of L/D. Where the cylinder is provided with an L/D of less than or equal to 2, the above method steps 310 and 320 are useful. FIG. 11 pictorially shows method steps 310 and 320, as well as an alternative embodiment where L/D is greater than 2. In this latter embodiment, second part 1001 is compressed upwards towards first part 1000, with the displaced matter of cylinder 1 forced into a generally conical formation. Further compression of the second part in a direction of the first part with an appropriately shaped die (not pictured) yields the same housing conformation as that from method steps 310 and 320, including flattened disk 1108 and protrusion 1103. In some embodiments, protrusion 1103 is a stabilizing feature in subsequent fabrication steps, as will be discussed below. These two methods allow for greater freedom when selecting the starting cylinder of malleable material for performing the instant invention.

A non-magnetic region is then provided 330 on said cylinder 1. As previously described in connection with FIG. 2, in one embodiment the non-magnetic region is provided through use of a perforated region, a region comprised on non-magnetic material, a region with a smaller cross-sectional area than the cross-sectional area of the remainder of cylinder 1, and combinations thereof. In one embodiment, production of the non-magnetic region begins by providing a notch about the circumference of cylinder 1. A bore is then extended 340 through said first part 1000 in a direction towards said second part 1001. In one embodiment, said bore is extended a distance from said first part towards said second part such that said bore goes beyond the non-magnetic region.

This series of steps is best exemplified in FIG. 11. In one embodiment, the notch 1104 is provided to cylinder 1 through a cold-forging method, a machining method, or a combination of both. The depth and shape of notch 1104 is a matter of design choice. A bore 1105 is applied and extended to some distance beyond notch 1104. In one embodiment, bore 1105 is extended via a machining step. In a further embodiment, bore 1105 is extended substantially all the way through cylinder 1. The width of bore 1105 is a matter of design choice and depends heavily on the armature to be utilized in the solenoid and the depth of notch 1104.

As described above, in one embodiment, the non-magnetic region is provided through use of a region with a smaller cross-sectional area than the remainder of cylinder 1. The cross-sectional areas of the non-magnetic region and the remainder of cylinder 1 refer to the cross-sectional areas of 1106 and 1107 respectively after a bore is extended 340 in cylinder 1. Bore 1105 turns cylinder 1 into a hollow tube at least as far as bore 1105 is made in cylinder 1. In one embodiment, the cross-sectional area of non-magnetic region 1106 is at least 5-25% of the cross-sectional area of the remainder 1107 of cylinder 1. In a further embodiment, the cross-sectional area of non-magnetic region 1106 is 10-20% of the cross-sectional area of the remainder 1107 of cylinder 1. In other embodiments, notch 1104 is filled with non-magnetic material, such as aluminum-bronze. In these embodiments, the cross-sectional area of region 1106 is advantageously reduced to zero or at least near zero. Region 1106 is therefore exclusively non-magnetic material in this embodiment, with the original malleable material of cylinder 1 completely removed.

In much the same way as described above, in some embodiments, the solenoid housing is annealed 370 before or after at least one of the steps of 300, 310, 320, 330, and 340. In a further embodiment, annealing step 370 occurs before and after each of steps 310, 320, 330, and 340.

In one embodiment, a cup is provided 350 for assembly with or placement around cylinder 1. In some embodiments, such as the embodiment shown in FIG. 7, the cup is provided by a cold-forging method. In this embodiment, a sheet of malleable material is provided 700. A perimeter of the sheet is then raised 710 to produce a raised perimeter. In some embodiments, said raised perimeter extends around at least a portion of said sheet of malleable material. In a further embodiment, the raised perimeter extends around the entire perimeter of the sheet. The raised perimeter is then extended 720 to define a cup with a base. A recess is then provided 730 is said base of said cup. In one embodiment, the recess is provided by a punching method or a machining method. The size of the recess is a matter of design choice. However, the purpose of the recess is to accept the protrusion provided in method step 400, as will be discussed below. Therefore, the recess is at least large enough to accept the protrusion. In further embodiments, the perimeter of the recess is also smaller than the perimeter of the flattened disk.

In one embodiment, a flange is then expanded 740 on said raised perimeter. In some embodiments, expansion step 740 provides a flange by expanding the material already present in said raised perimeter. In further embodiments, expansion step 740 is combined with a step of removing excess material from the raised perimeter (not pictured). Excess material is removed to produce a solenoid housing with the desired shape or dimension. In one embodiment, for example, excess material is removed from the cup such that the heights of the cup and the cylinder of malleable material are approximately the same.

Figure 9:
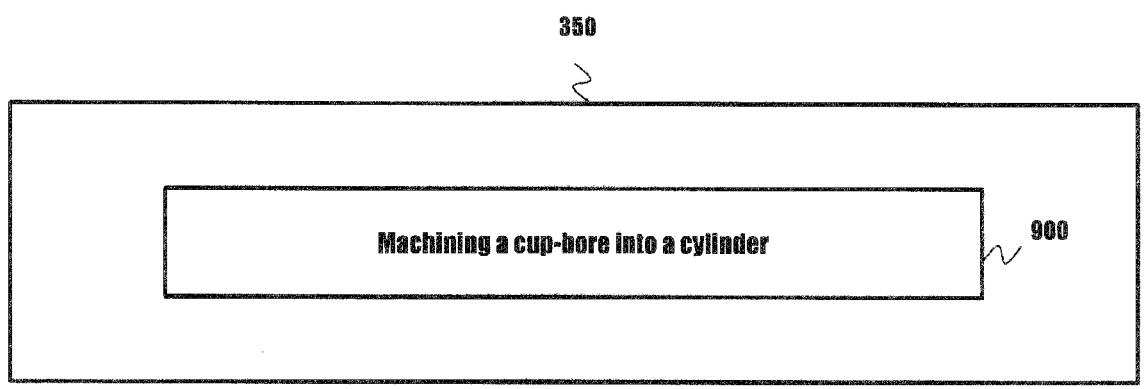
FIG. 9 depicts a further embodiment of the method of providing a solenoid housing from FIG. 3.

In another embodiment, as depicted in FIG. 9, the cup is provided 900 through a machining method which machines a cup-bore into a cylinder of suitable material.

The cup provides the outer housing for the solenoid assembly, encloses the solenoid coil, and provides protection for the coil and armature assembly. The shape and size of the sheet of malleable material is a matter of design choice and greatly depends on the shape of cylinder 1 and the intended use of the solenoid itself.

Figure 12:
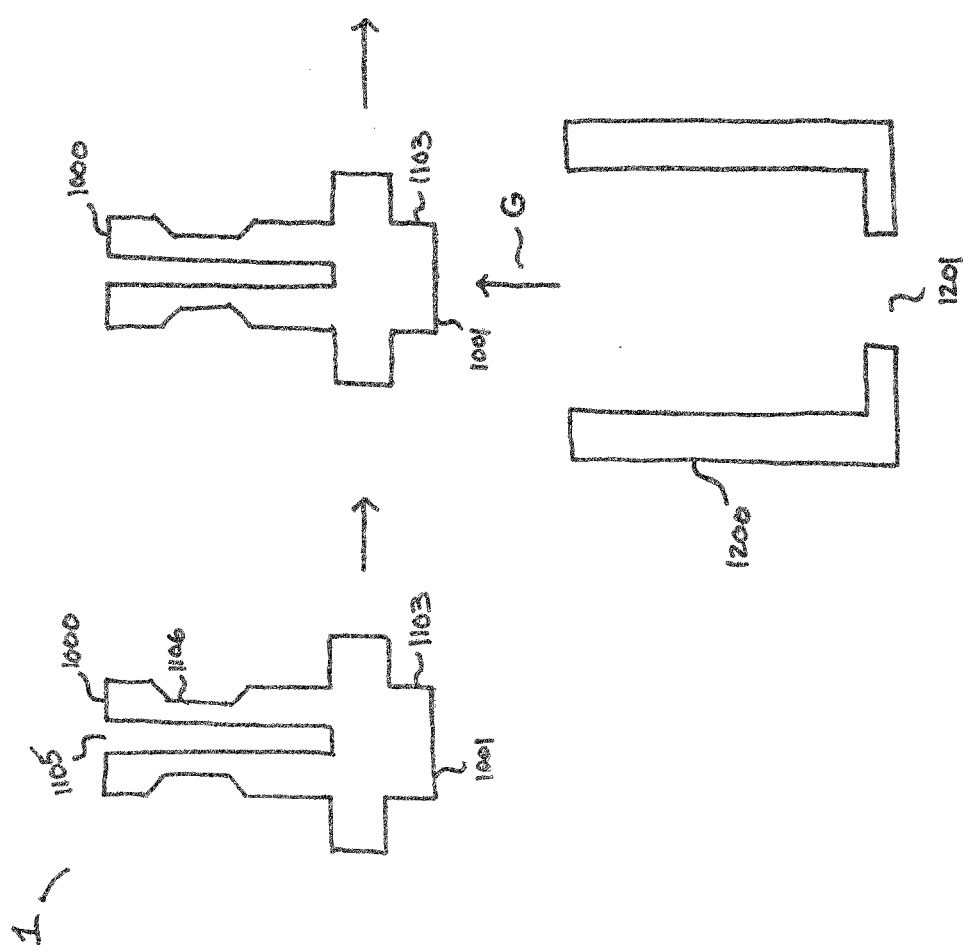
FIG. 12 shows a flowchart depicting the production of a solenoid housing consistent with the method as depicted in FIG. 3.

The application of the cup to cylinder 1 is pictorially demonstrated in FIG. 12. As can be seen in this figure, cylinder 1 has already been provided with bore 1105, non-magnetic region 1106, and protrusion 1103. Cup 1200 is provided with an inner diameter at least large enough to accept flattened disk 1108. In some embodiments, the outer diameter of flattened disk 1108 and the inner diameter of cup 1200 are essentially equal to ensure a tight fit between the two pieces. Cup 1200 is also provided with a recess 1201. In some embodiments, recess 1201 is at least large enough to accept all of protrusion 1103. In one embodiment, protrusion 1103 has a length greater than the depth of recess 1201. As depicted in FIG. 12, cup 1200 is inserted along direction G so as to fit snuggly around cylinder 1.

Figure 5:
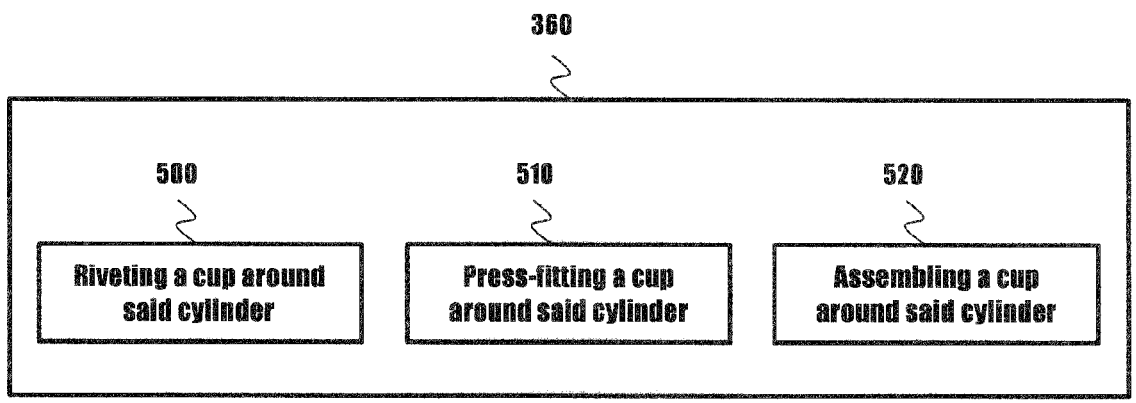
FIG. 5 depicts a further embodiment of the method of providing a solenoid housing from FIG. 3.
Figure 6:
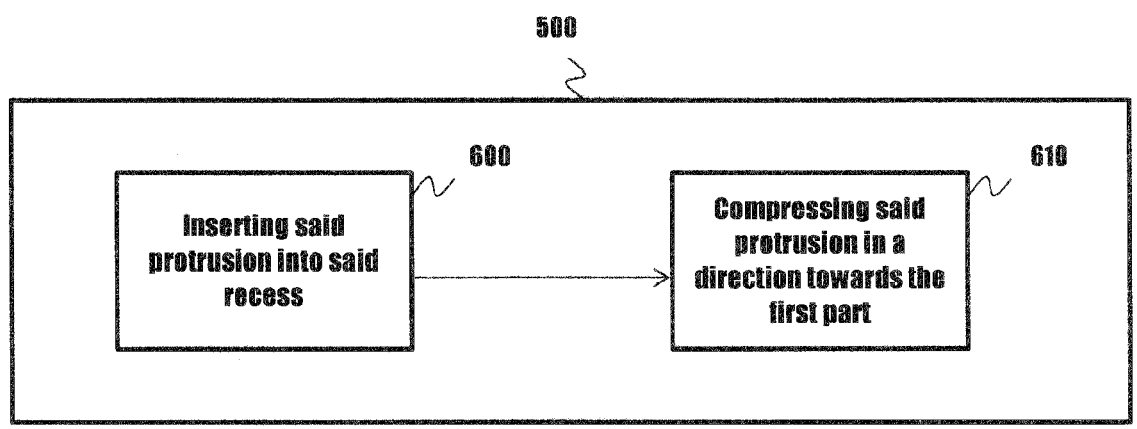
FIG. 6 depicts a further embodiment of the method of providing a solenoid housing from FIG. 5.
Figure 7:
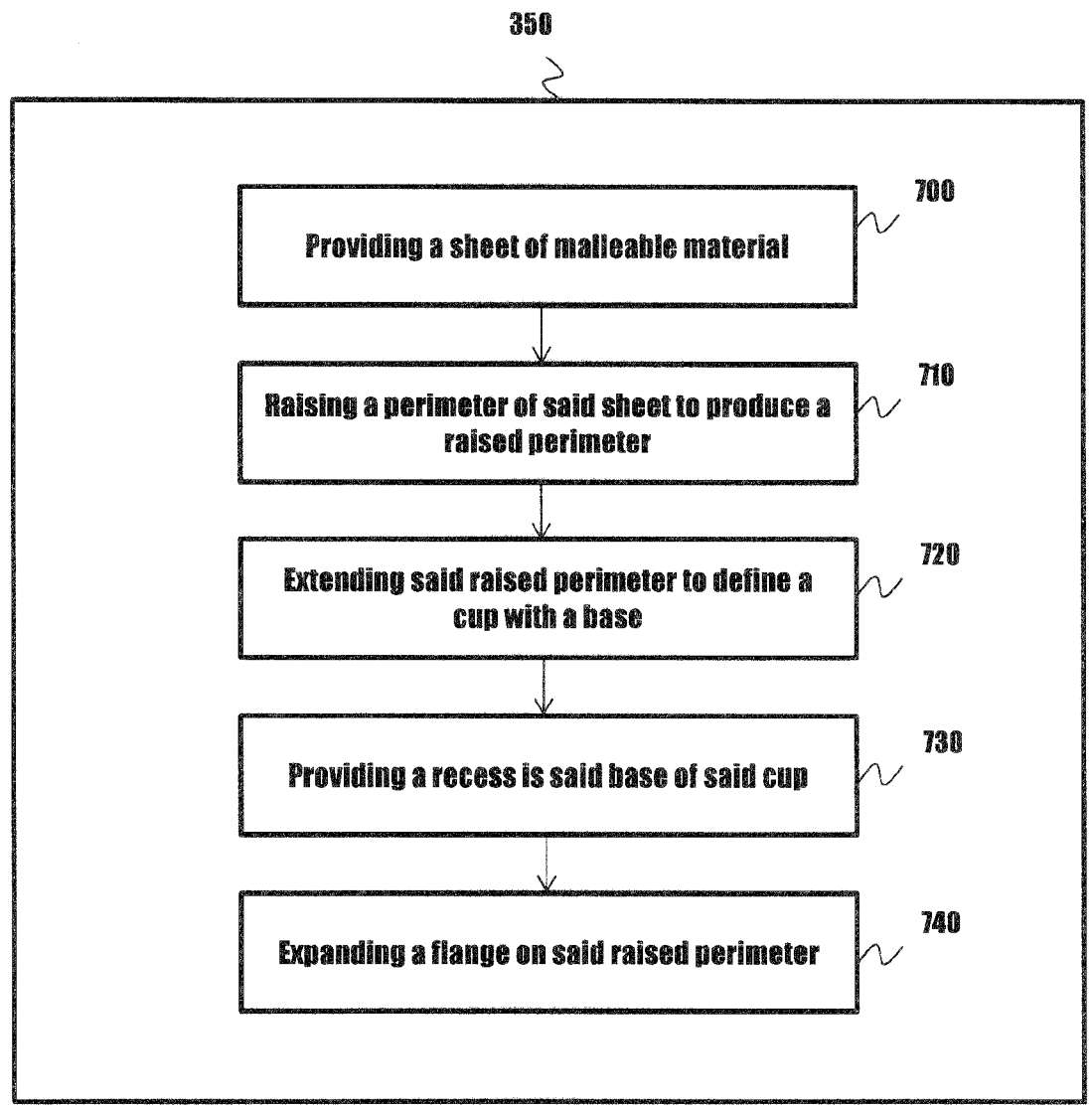
FIG. 7 depicts a further embodiment of the method of providing a solenoid housing from FIG. 3.
Figure 13:
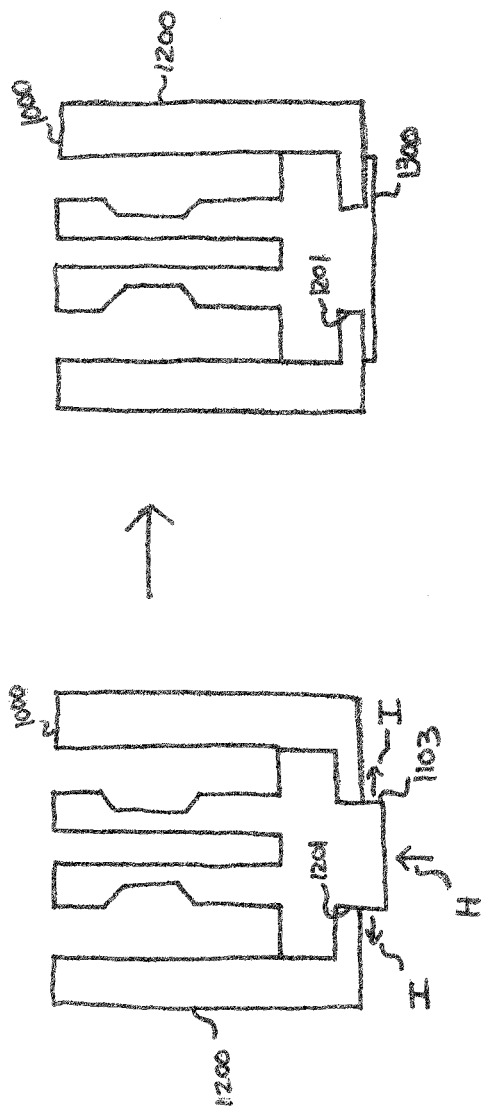
FIG. 13 shows a flowchart depicting the production of a solenoid housing consistent with the method as depicted in FIG. 6.

The interaction between recess 1201 and protrusion 1103 holds cylinder 1 and cup 1200 in alignment. In one embodiment, cup 1200 and cylinder 1 are then held in place via a riveting step, a press fitting step, an assembling step, and the like, as seen in FIG. 5. In one embodiment, cup 1200 is attached through a riveting method as shown in FIG. 6, which provides a more secure and permanent fit between the two pieces. In this embodiment, protrusion 1103 is inserted 600 into recess 1201 and the perimeter of protrusion 1103 is compressed 610 in a direction towards first part 1000, such as via a cold-forging method. In some embodiments, compression step 610 enlarges the perimeter to a size larger than the perimeter of the recess (also known as the recess perimeter), thus preventing cup 1200 from disengaging from cylinder 1. This embodiment is also depicted in FIG. 13, where cup 1200 is already in place on cylinder 1. Application of force H causes expansion of protrusion 1103 in direction I. The resulting protrusion-end perimeter 1300 holds cup 1200 securely in place and limits movement of cup 1200 in relation to cylinder 1.

In another embodiment, cup 1200 and cylinder 1 are held together via a press-fitting step 510. Press-fitting step 510 relies on the frictional interaction between the outer perimeter of protrusion 1103 and the inner circumference of recess 1201. In yet another embodiment, cup 1200 and cylinder 1 are assembled 520, and are kept stationary relative to each other by interaction with other components in the solenoid assembly or apparatus into which the solenoid assembly is incorporated.

While the present invention has been particularly described, it is evident that many alternatives, modifications and variations will be apparent to those skilled in the art in light of the foregoing description. It is therefore contemplated that the appended claims will embrace any such alternatives, modifications, and variations as falling within the true scope and spirit of the present invention.

What is claimed is:

1. A method of providing a solenoid housing, comprising the steps of:
   providing a cylinder of malleable material having a part;
   extending a flange from said part;
   raising at least a portion of said part to form a raised wall axially between said flange and said part;
   raising a center-pole from said part;
   extending a bore axially through said center-pole to produce a center-pole raised wall; and
   providing said center-pole raised wall with a non-magnetic region selected from the group consisting of:
   a perforated region, a region comprised of non-magnetic material, a region wherein said region has a smaller cross sectional area than a cross sectional area of the remainder of the center pole raised wall, and combinations thereof.

2. The method of providing a solenoid housing according to claim 1, further comprising a step of annealing said solenoid housing following at least one of the following steps:
   providing a cylinder of malleable material having a part;
   extending a flange from said part;
   raising at least a portion of said part to form a raised wall; and
   raising a center-pole from said part.

* * * * *